(12) United States Patent
Yanaga et al.

(10) Patent No.: US 12,508,778 B2
(45) Date of Patent: Dec. 30, 2025

(54) LAYERED COMPOSITE

(71) Applicants: TOYO KOHAN CO., LTD., Tokyo (JP); SUNCORONA ODA CO., LTD., Komatsu (JP)

(72) Inventors: Hiroki Yanaga, Tokyo (JP); Hirofumi Tashiro, Kudamatsu (JP); Hideki Yamagata, Tokyo (JP); Keisuke Sone, Komatsu (JP); Masaki Kobayashi, Komatsu (JP)

(73) Assignees: Toyo Kohan Co., Ltd., Tokyo (JP); Suncorona Oda Co., Ltd., Ishikawa (JP)

( * ) Notice: Subject to any disclaimer, the term of this patent is extended or adjusted under 35 U.S.C. 154(b) by 400 days.

(21) Appl. No.: 17/781,197

(22) PCT Filed: Dec. 1, 2020

(86) PCT No.: PCT/JP2020/044663
§ 371 (c)(1),
(2) Date: May 31, 2022

(87) PCT Pub. No.: WO2021/112077
PCT Pub. Date: Jun. 10, 2021

(65) Prior Publication Data
US 2023/0001652 A1    Jan. 5, 2023

(30) Foreign Application Priority Data

Dec. 2, 2019    (JP) .................................. 2019-218335

(51) Int. Cl.
*B29C 70/14*    (2006.01)
*B29C 70/34*    (2006.01)
(Continued)

(52) U.S. Cl.
CPC .............. *B29C 70/14* (2013.01); *B29C 70/34* (2013.01); *B32B 3/02* (2013.01); *B32B 15/08* (2013.01);
(Continued)

(58) Field of Classification Search
CPC ....... B29C 70/14; B29C 70/34; B29C 70/885; B29C 70/12; B32B 3/02; B32B 15/08;
(Continued)

(56) References Cited

U.S. PATENT DOCUMENTS 9,527,230 B2    12/2016  Takeuchi et al.
2014/0303306 A1*  10/2014  Kajiwara ................. C08J 5/042
                                                                  524/496
2017/0136738 A1*   5/2017  Koga ..................... B32B 27/34

FOREIGN PATENT DOCUMENTS

JP    2010089394 A    4/2010
JP    2010150390 A    7/2010
(Continued)

*Primary Examiner* — Matthew D Matzek
(74) *Attorney, Agent, or Firm* — FISHERBROYLES, LLP; Roger L. Browdy (57) ABSTRACT

[Object]
The purpose of the present invention is to provide a layered composite that is high in both flexural modulus and moldability.
[Solving Means]
Provided is a layered composite including a carbon-fiber-reinforced resin in which a chopped strand prepreg obtained by impregnating fiber in resin is oriented in such a manner as to exhibit pseudo-isotropic properties, and a steel plate that is layered on at least one surface of the carbon-fiber-reinforced resin and has a tensile breakage elongation φ of equal to or more than 20%, the flexural modulus in a flat plate state obtained in compliance with ASTM D-790 being equal to or more than 30 GPa.

4 Claims, 2 Drawing Sheets

(51) Int. Cl.
  *B32B 3/02* (2006.01)
  *B32B 15/08* (2006.01)
  *B32B 15/18* (2006.01)
  *B32B 25/02* (2006.01)
  *B32B 33/00* (2006.01)
  *B32B 37/20* (2006.01)
  *B29K 307/04* (2006.01)
  *B29L 31/00* (2006.01)
(52) U.S. Cl.
  CPC .............. *B32B 15/18* (2013.01); *B32B 25/02* (2013.01); *B32B 33/00* (2013.01); *B32B 37/20* (2013.01); *B29K 2307/04* (2013.01); *B29L 2031/001* (2013.01); *B32B 2250/02* (2013.01); *B32B 2255/06* (2013.01); *B32B 2255/205* (2013.01); *B32B 2262/106* (2013.01); *B32B 2305/076* (2013.01); *B32B 2305/08* (2013.01); *B32B 2307/54* (2013.01); *B32B 2307/546* (2013.01); *B32B 2311/30* (2013.01); *B32B 2313/04* (2013.01)
(58) Field of Classification Search
  CPC ......... B32B 15/18; B32B 25/02; B32B 33/00; B32B 37/20; B32B 2250/02; B32B 2255/06; B32B 2255/205; B32B 2262/106; B32B 2305/076; B32B 2305/08; B32B 2307/54; B32B 2307/546; B32B 2311/30; B32B 2313/04; B32B 5/02; B32B 15/14; B32B 2250/40; B32B 2260/021; B32B 2260/046; B32B 2262/16; C08J 2471/02; C08J 3/122; C08J 2361/06; C08J 2363/00; C08J 5/243; C08J 7/042; C08J 7/043; C08J 7/05; B29K 2307/04; B29L 2031/001
  USPC ...................................... 428/297.4
  See application file for complete search history.

(56) References Cited

FOREIGN PATENT DOCUMENTS

| | | |
|---|---|---|
| JP | 2012109452 B2 | 6/2012 |
| JP | 5634641 B2 | 12/2014 |
| JP | 6176691 B1 | 8/2017 |
| JP | 2019119213 A | 7/2019 |
| WO | WO-2017090676 A1 * | 6/2017 |

* cited by examiner

LAYERED COMPOSITE

TECHNICAL FIELD

The present invention relates to a layered composite of a carbon-fiber-reinforced resin and metal.

BACKGROUND ART

Hitherto, it has been known that a carbon-fiber-reinforced resin is used as automobile members and housings of electronic apparatuses. Such a carbon-fiber-reinforced resin has both high strength and high moldability, and a molded body is manufactured by a mold pressing method, an autoclave method, and the like.

For example, PTL 1 discloses a carbon-fiber-reinforced resin exhibiting isotropic properties which is manufactured by disposing prepregs in a manner of layering the prepregs at random and by heating and processing the prepregs. Such a carbon-fiber-reinforced resin typically has such characteristics that molding in a short period of time is possible, secondary processing is possible, or recycle can easily be performed. Owing to these characteristics, the carbon-fiber-reinforced resin has come into attention to be used as automobile and electronic apparatus members which are relatively low in cost, large in the number of production, and demanded to have complicated shapes.

CITATION LIST

Patent Literature

[PTL 1]
  Japanese Patent No. 6176691
[PTL 2]
  Japanese Patent Laid-open No. 2012-109452
[PTL 3]
  Japanese Patent Laid-open No. 2010-89394
[PTL 4]
  Japanese Patent Laid-open No. 2010-150390
[PTL 5]
  Japanese Patent Laid-open No. 2019-119213
[PTL 6]
  Japanese Patent No. 5634641

SUMMARY

Technical Problems

Meanwhile, the carbon-fiber-reinforced resin described in PTL 1 is one having both strength and moldability, but a problem is yet to be solved in terms of elastic modulus which is another important parameter.

The carbon-fiber-reinforced resin using cut fibers as described in PTL 1 itself has certain degrees of strength and moldability, but when the carbon-fiber-reinforced resin is used alone, it has been difficult to largely enhance the elastic modulus while maintaining isotropic properties. On the other hand, the carbon-fiber-reinforced resin which does not have isotropic properties such as a continuous fiber has a problem in terms of moldability in that complicated molding is impossible in the first place.

In recent years, amidst the development of composite materials according to various uses, composite materials in which metal and a fiber-reinforced resin are bonded are under development. For example, PTL 2 to PTL 6 disclose technologies in which a metallic material such as steel plate or aluminum and a fiber-reinforced resin are layered through or not through an adhesive. In any of the technologies, it is intended to provide a composite material in which metal and a fiber-reinforced resin are joined for the purpose of enhancing specific rigidity and specific strength or lightening and enhancing strength.

It is an object of the present invention to provide a layered composite having high levels of both flexural modulus and moldability, in a composite material in which metal and a carbon-fiber-reinforced resin are layered. Particularly, it is an object to provide, in a layered composite including a carbon-fiber-reinforced resin having isotropic properties in which carbon fibers are impregnated with a thermoplastic resin and a metallic material (steel plate) layered on at least one surface of the carbon-fiber-reinforced resin, a layered composite having a high flexural modulus and a molded body having a high flexural modulus by use of the layered composite.

Solution to Problems

A layered composite of the present embodiment is (1) a layered composite including a carbon-fiber-reinforced resin in which a chopped strand prepreg obtained by impregnating carbon fiber in resin is oriented and layered in such a manner as to exhibit pseudo-isotropic properties, and a steel plate that is layered on at least one surface of the carbon-fiber-reinforced resin and has a tensile breakage elongation $\phi$ of equal to or more than 20%, in which the flexural modulus in a flat plate state obtained in compliance with American Society for Testing and Materials (ASTM) D-790 is equal to or more than 30 GPa, and, in evaluation of moldability of the layered composite in an element type illustrated in an example, at least one of a wrinkle, breakage, and a gap at a layered interface is not generated in the steel plate when molding is conducted with a punch shoulder radius of $0<R\le2$.

In addition, a layered composite of the present embodiment includes (2) a carbon-fiber-reinforced resin in which a chopped strand prepreg obtained by impregnating carbon fiber in resin is oriented in such a manner as to exhibit pseudo-isotropic properties, and a steel plate that is layered on at least one surface of the carbon-fiber-reinforced resin and has a tensile breakage elongation $\phi$ of equal to or more than 20%, in which the flexural modulus in a flat plate state obtained in compliance with ASTM D-790 is equal to or more than 30 GPa.

Besides, in a layered composite of the present embodiment in (2) above, (3) in an evaluation of moldability of the layered composite in an element type illustrated in an example, at least one of a wrinkle, breakage, and a gap at the layered interface is preferably not generated in the steel plate when molding is conducted with a punch shoulder radius of $0<R\le2$.

It is preferable that, in the layered composite of the present embodiment in any one of (1) to (3) above, (4) the ratio of the thickness of the steel plate to the total thickness of the layered composite be 1% to 20%.

It is preferable that, in the layered composite of the present embodiment in any one of (1) to (4) above, (5) the steel plate have a value S of the following formula of equal to or more than 7.5: S=(thickness t of steel plate×tensile breakage elongation $\phi$)/(frictional coefficient $\mu$ of steel plate).

It is preferable that, in the layered composite of the present embodiment in any one of (1) to (5) above, (6) a specific flexural modulus of the layered composite be equal to or more than 20 but equal to or less than 25.

It is preferable that, in the layered composite of the present embodiment in any one of (1) to (6) above, (7) the steel plate be a surface treated steel plate, and the surface treatment be plating including Zn or Ni.

A molded body of the present embodiment is (8) a molded body molded by the layered composite according to any one of (1) to (7) above, characterized by having a shoulder part with a shoulder radius of 0<R≤2.

Advantageous Effects of Invention

According to the present invention, it is possible to provide a layered composite having a high flexural modulus and a molded body, in a composite material in which a steel plate and a carbon-fiber-reinforced resin are layered.

DESCRIPTION OF EMBODIMENT

<<Layered Composite 10>>

An embodiment for carrying out the present invention will be described below.

Figure 1:
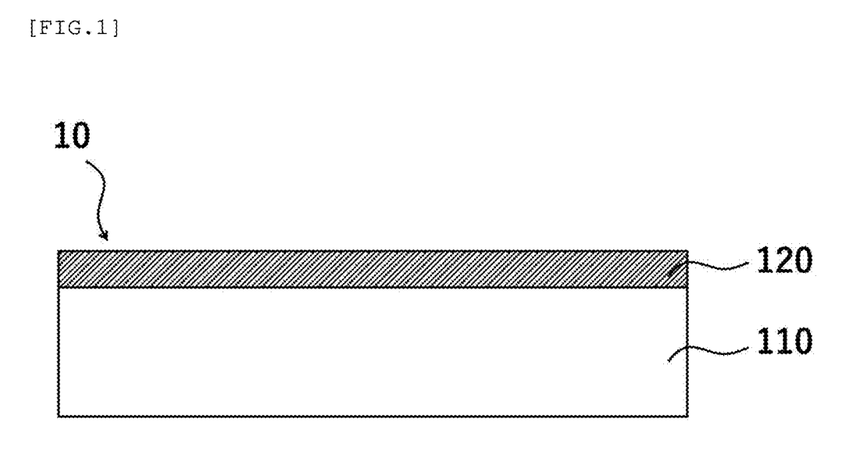
FIG. 1 is a schematic view depicting a section of a layered composite 10 of the present embodiment.

FIG. 1 is a diagram schematically depicting a layered composite according to the present embodiment. Note that a layered composite 10 of the present embodiment is used for an automobile member, an electronic apparatus member, or the like. The layered composite 10 of the present embodiment may be used in a flat plate state, or may be subjected to such molding as press molding under heating and/or pressure.

As depicted in FIG. 1, the layered composite 10 of the present embodiment includes a carbon-fiber-reinforced resin 110 and a steel plate 120 layered on at least one surface of the carbon-fiber-reinforced resin 110. Note that, in FIG. 1, the steel plate 120 is layered on one side of the carbon-fiber-reinforced resin 110 to constitute a two-layer structure, but the present invention is not limited to this.

In other words, the steel plates 120 may be layered on both sides of the carbon-fiber-reinforced resin 110 to constitute a three-layer structure. In addition, the carbon-fiber-reinforced resins 110 and the steel plates 120 may alternately be layered to constitute a multilayer structure.

The layered composite 10 of the present embodiment is characterized by a flexural modulus of equal to or more than 30 GPa in a flat plate state. The reason is as follows.

In general, at the time of manufacturing a molded body by use of a carbon-fiber-reinforced resin, secondary processing is possible as an advantage of a thermoplastic resin, so that press molding using a press mold has often been conducted for a flat plate shaped carbon-fiber-reinforced resin. However, the present inventors, in manufacturing a molded body by the abovementioned method, found out that the molded body is lowered in the flexural modulus as compared to a flat plate, as a disadvantage of secondary processing.

On the other hand, for example, an electronic apparatus housing for protecting a precision part, enhancement of both thinning and rigidity is demanded. In the case where the housing is formed from only resin, it is necessary to increase the material thickness to enhance rigidity, but layering metal makes it possible to enhance rigidity of the layered body as a whole without increasing the material thickness of the resin part. For example, since an upper limit of the housing thickness is often determined for the housing of a personal computer (PC) or the like, it is an advantage that rigidity as a whole can be enhanced without increasing the material thickness of the resin. Yet, one method of enhancing the rigidity is to enhance the flexural modulus of the material.

Hence, the present inventors, in order to enhance the flexural modulus to some extent also in a molded body by secondary processing, repeatedly made studies for enhancing flexural modulus even in a state of being in a flat plate before molding.

Note that, though the reason why the molded body is lowered in flexural modulus as compared to a flat plate is yet to be clarified, material flow of the carbon-fiber-reinforced resin at the time of secondary processing is assumed to affect the flexural modulus.

Further, the present inventors found out that, when the carbon-fiber-reinforced reason and the steel plate are layered on each other to constitute a layered composite, in a flat plate state, the flexural modulus can be enhanced as compared to the case where the layered composite includes the carbon-fiber-reinforced resin alone. Further, the present inventors also found out that, in the case where the molded body is manufactured by secondary processing, lowering in flexural modulus cannot be avoided as compared to a flat plate, but the flexural modulus can be enhanced as compared to the case where the layered composite includes the carbon-fiber-reinforced resin alone, thereby arriving at the present invention.

In other words, in the layered composite 10 in the present embodiment, by setting the flexural modulus to be equal to or more than 30 GPa in a flat plate state, even when an automobile member or the like is manufactured by secondary processing, the flexural modulus of the molded body can be made to be equal to or more than a predetermined value. Here, the value of the flexural modulus of the present embodiment can be obtained in compliance with ASTM D-790.

Note that, in the layered composite 10 of the present embodiment, the specific flexural modulus is preferably equal to or more than 20, from the same point of view as described above. Note that the specific flexural modulus is a value obtained by dividing the flexural modulus obtained as described above by the specific gravity of the layered composite 10.

The thickness of the layered composite 10 of the present embodiment is not particularly limited to any value, and is appropriately modified according to use. For example, the thickness is preferably on the order of 0.3 to 3.0 mm from the viewpoint of physical properties and moldability.

<Carbon-Fiber-Reinforced Resin 110>

Next, a carbon-fiber-reinforced resin 110 used for the layered composite 10 of the present embodiment will be described. As the carbon-fiber-reinforced resin 110, applied is a carbon-fiber-reinforced resin in which a chopped strand prepreg including carbon fiber tow impregnated with resin is oriented in such a manner as to exhibit pseudo-isotropic properties is applied.

The carbon fiber tow specifically used may be a pitch type carbon fiber or may be a polyacrylonitrile (PAN) type carbon fiber, but is preferably the PAN type carbon fiber from the viewpoint of handleability. The filament diameter of one carbon fiber is normally 5 to 8 µm, and a fiber bundle in which a plurality of carbon fibers are collected in a flat form in a predetermined filament number is preferably used. The filament number of the carbon fibers is 3,000 to 600,000 from the viewpoint of productivity of the prepreg manufacture, more preferably 6,000 to 24,000. In addition, when used for the layered composite 10, the carbon fiber may be used alone, or may be used in combination with reinforcing fibers other than a carbon fiber. Examples of the reinforcing fiber which can be used in combination include known fibers such as an aramid fiber, a polyethylene fiber, a glass fiber, metallic fiber, and a natural fiber.

The carbon fiber used for the layered composite 10 of the present embodiment is preferably spread from the viewpoint of enhancing penetration of the matrix resin at the time of manufacturing the prepreg, and, in the case of using a reinforcing fiber other than the carbon fiber in combination, the reinforcing fiber other than the carbon fiber is also preferably spread On the other hand, as the resin to be used for the carbon-fiber-reinforced resin 110, a thermoplastic resin is preferable from the viewpoint of the abovementioned processability or the like. As the thermoplastic resin, a known thermoplastic resin used as a matrix of a fiber-reinforced resin can be applied. Specifically, an in-situ polymerization type thermoplastic epoxy resin is preferably used, and the use of a bisphenol A type epoxy resin is particularly preferable from the viewpoint of high penetration to fibers at the time of prepreg manufacture and adhesion to the steel plate used in the present embodiment.

The carbon-fiber-reinforced resin 110 used in the present embodiment can be obtained as follows. A uni-directional prepreg (for example, uni-directional (UD) tape) cut to a predetermined length (chopped strand prepreg) that is obtained by impregnating the abovementioned carbon fiber in a thermoplastic resin is layered by being scattered at random, is then heated to soften the resin and fix the tape pieces together, whereby the carbon-fiber-reinforced resin 110 of the present embodiment can be obtained. Other than this, by a method of layering the tape pieces at random and then heating and pressing them or by a method of directly scattering and layering the tape pieces in a mold at the time of manufacture of the layered composite 10 or the like, for example, the carbon-fiber-reinforced resin 110 can be obtained.

In addition, as the uni-directional prepreg used for the carbon-fiber-reinforced resin 110 of the present embodiment, use of a uni-directional prepreg including carbon fiber tow impregnated with a thermoplastic resin without any void (bubbles or the like) being contained between fibers is preferable at prepreg manufacture. This makes it possible to enhance the close contact properties of the uni-directional prepreg in the carbon-fiber-reinforced resin 110 obtained, and further enhance the strength and isotropic properties of physical properties of the layered composite 10.

In the layered composite 10 of the present embodiment, the fiber volume content Vf of the uni-directional prepreg is preferably controlled to be 30% to 55%, more preferably 35% to 45%. The abovementioned range is preferable from the viewpoint of enhancing moldability of the molded body. When the volume content exceeds the upper limit, a non-impregnated part of the prepreg is increased, making it difficult to make the prepreg voidless, which is unfavorable. On the other hand, when the volume content is below the lower limit, it is difficult to secure strength of the layered composite 10, which is unfavorable.

Besides, an average length in the fiber direction of the uni-directional prepreg is 10 to 50 mm, preferably 10 to 30 mm.

Note that, by layering the chopped strand prepreg at random as described above, the carbon-fiber-reinforced resin 110 comes to exhibit pseudo-isotropic properties, and the moldability of the layered composite 10 obtained as a result can be enhanced.

In addition, in the present embodiment, as the uni-directional prepreg in the tape form, for example, the one disclosed in PTL 1 can be used.

The thickness of the carbon-fiber-reinforced resin 110 in the present embodiment is not particularly limited to any value, but, for example, is preferable to be on the order of 0.1 to 2.0 mm from the viewpoint of weight saving. In addition, the thickness of the carbon-fiber-reinforced resin may appropriately be modified according to the shape of the molded body.

The flexural modulus Gc of the carbon-fiber-reinforced resin 110 in the present embodiment is preferably equal to or more than 20 GPa, in light of the flexural modulus required of the layered composite 10.

<Steel Plate 120>

Next, the steel plate 120 will be described. Note that, as depicted in FIG. 1, the steel plate 120 in the present embodiment may be layered at least on one side of the carbon-fiber-reinforced resin 110, or may be layered on both sides of the carbon-fiber-reinforced resin 110 though not illustrated, or the steel plate 120 and the carbon-fiber-reinforced resin 110 may alternately be layered in multilayer.

Examples of the steel plate 120 used for the layered composite 10 of the present embodiment include a known steel plate. As the steel plate, a hot rolled steel plate obtained by hot rolling an aluminum-killed continuous cast steel and removing the scale formed on the surface, or a cold rolled steel plate obtained by cold rolling a hot rolled steel plate and annealing the cold rolled steel plate is applicable.

Note that the steel plate 120 to be used in the present embodiment is preferably a surface treated steel plate from the viewpoint of close contact properties (restraint of gap at layered interface) with the carbon-fiber-reinforced resin 110 and control of frictional coefficient, particularly, enhancement of moldability by reduction of frictional coefficient, corrosion resistance, and the like. Examples of the surface treatment includes plating, chemical conversion treatment, resin coating, or surface roughening, each of which can be used preferably.

As a plated steel plate, for example, a plated steel plate provided with a monolayer plating of any of Sn, Ni, Co, Mo, Zn, and Cr or a multilayer plating or an alloy plating (compound plating) of two or more kinds can be used. Among others, a Zn plated steel plate or an Ni plated steel plate is preferable. In this case, the Zn plating includes Zn alloy plating, and the Ni plating includes Ni alloy plating.

In addition, as the abovementioned chemical conversion treatment, for example, chemical conversion using known chromate system, phosphate system, vanadic acid system, silicate system, and the like can be applied.

Besides, as the abovementioned resin coating, for example, known polyester resin, urethane resin, acrylic resin, and the like can be mentioned.

In addition, as the abovementioned surface roughening, roughening the surface of the steel plate by use of a known roughening technique such as temper rolling using rolling rolls having a predetermined surface roughness, a blast treatment, chemical etching, laser irradiation, or the like makes it possible to enhance close contact properties between the steel plate 120 and the carbon-fiber-reinforced resin 110 by an anchor effect.

In securing both moldability and close contact properties, the interface side with respect to the carbon-fiber-reinforced resin 110 of the steel plate 120 is preferably roughened. On the other hand, the other surface (opposite side) which is an outer side may be flat without being roughened from the viewpoint of reduction of frictional coefficient, design, and the like.

Note that the steel plate 120 of the present embodiment is characterized by a tensile breakage elongation ($\phi$) of equal to or more than 20%. In other words, the layered composite 10 of the present embodiment, as described above, is characterized by having both flexural modulus and moldability at high levels in a flat plate state. As a result of repeated experiment by the present inventors, while the tensile breakage elongation of the steel plate 120 is equal to or more than 20%, the flexural modulus of the layered composite 10 in the flat plate state is equal to or more than 30 GPa, whereby flexural modulus and moldability are both secured at high levels.

The thickness (plate thickness t) of the steel plate 120 of the present embodiment is preferably on the order of 0.05 to 2.0 mm, depending on the use of the layered composite 10 obtained, and particularly preferably in the range of 0.05 to 0.50 mm. The steel plate 120 having a thickness less than 0.05 mm is unfavorable in terms of manufacture and handleability. On the other hand, the steel plate 120 having a thickness exceeding 2.0 mm makes it difficult to achieve the purpose of weight saving in the final molded body or the like.

Note that, in the present embodiment, the thickness ratio of the steel plate 120 to the total thickness of the layered composite 10 is preferably 1% to 50%, and, further, is particularly preferably 1% to 20% from the viewpoint of securing weight saving, strength, flexural modulus, and the like at high levels.

Further, the steel plate 120 of the present embodiment preferably has, in the case where the frictional coefficient at its surface (a surface making contact with a mold) is $\mu$, a parameter S represented by the following calculation formula (1) of equal to or more than 7.5.

$$S=(\text{plate thickness } t \text{ of steel plate} \times \text{tensile breakage elongation } \phi)/(\text{frictional coefficient } \mu \text{ of steel plate}) \quad (1)$$

As described above, the flexural modulus of the carbon-fiber-reinforced resin 110 should be reinforced by the steel plate 120; in the case where the above parameter S is equal to or more than 7.5, favorable moldability of the layered composite 10 can be obtained. In the case where the parameter S is equal to or more than 20, a further preferable result can be obtained in terms of moldability.

Note that the frictional coefficient $\mu$ of the steel plate in the calculation formula (1) can be measured by a known frictional coefficient measuring device. For example, specifically, the frictional coefficient can be measured by a Tribogear surface property measuring device (TYPE: 14FW) made by SHINTO Scientific Co., Ltd. An example of the measuring conditions is as follows.

Load: 200 g
Measuring distance: 20 mm
Moving speed: 100 mm/min
Test environment: 200° C.
Opposite material: SUS304 ($\phi$10 mm)

Note that the frictional coefficient $\mu$ can be varied according to the finish surface roughness of the steel plate, surface treatment, or the like. For example, by lowering the frictional coefficient of the steel plate making contact with the mold surface at the time of manufacture of the molded body, it becomes easy for the steel plate to enter the mold, and breakage or a wrinkle is not easily generated in the steel plate that has been subjected to molding.

Next, an example of a method of manufacturing a layered composite 10 (flat plate form) in the present embodiment will be illustrated below.

First, a mold for a layered composite in a flat plate form is heated to 180° C. at 5° C./min. After the mold temperature reaches 180° C., the carbon-fiber-reinforced resin 110 and the steel plate 120 are put into the mold, and are kept, for example, at 180° C. and 0.5 MPa for 3 minutes. Next, for example, the carbon-fiber-reinforced resin 110 and the steel plate 120 are pressed at 180° C. and 4 MPa for 12 minutes, and are then subjected to natural cooling. Then, when the mold temperature becomes 70° C. or below, load is removed (pressing is cancelled), whereby the layered composite 10 of the present embodiment can be obtained.

Note that the manufacturing method for the layered composite 10 in the flat plate form is not limited to the one under the above manufacturing conditions. A known manufacturing method can be applied insofar as the characteristics of the layered composite 10 are provided. For example, a method of extruding the melted carbon-fiber-reinforced resin 110 onto the steel plate 120 and a method of laminating a thermal adhesion film on the steel plate 120 followed by thermocompression bonding of the steel plate 120 with the thermal adhesion film and the carbon-fiber-reinforced resin 110 to form the layered composite 10 are applicable.

<<Molded Body 20>>

Next, the molded body 20 in the present embodiment will be described.

The molded body 20 in the present embodiment is characterized by being molded by the abovementioned layered composite 10. In other words, according to the abovementioned layered composite 10, for example, when a molded body is manufactured by application of press molding or the like under heating and/or pressurizing by a press molding method, even in the case where a mold with a relatively small R at a corner part is used, generation of at least one of a wrinkle, breakage, and a gap at a layered interface in the molded body can be restrained.

Figure 2:
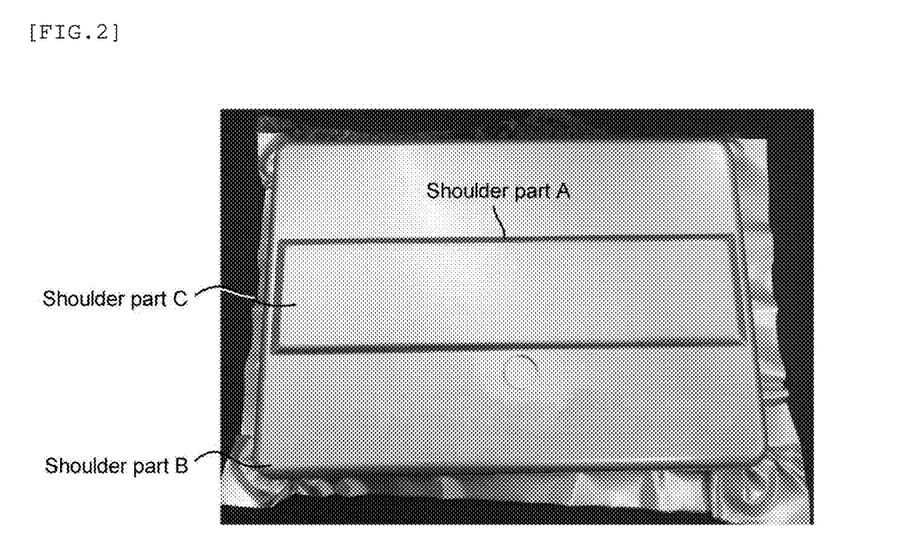
FIG. 2 is a schematic view for depicting an example of a mold for manufacturing a molded body 20 of the present embodiment.

FIG. 2 depicts an example of a mold MD as a mold for manufacturing the molded body 20 of the present embodiment. FIG. 2 is a front view of the mold MD used for manufacturing the molded body 20 of the present embodiment.

Figure 3:
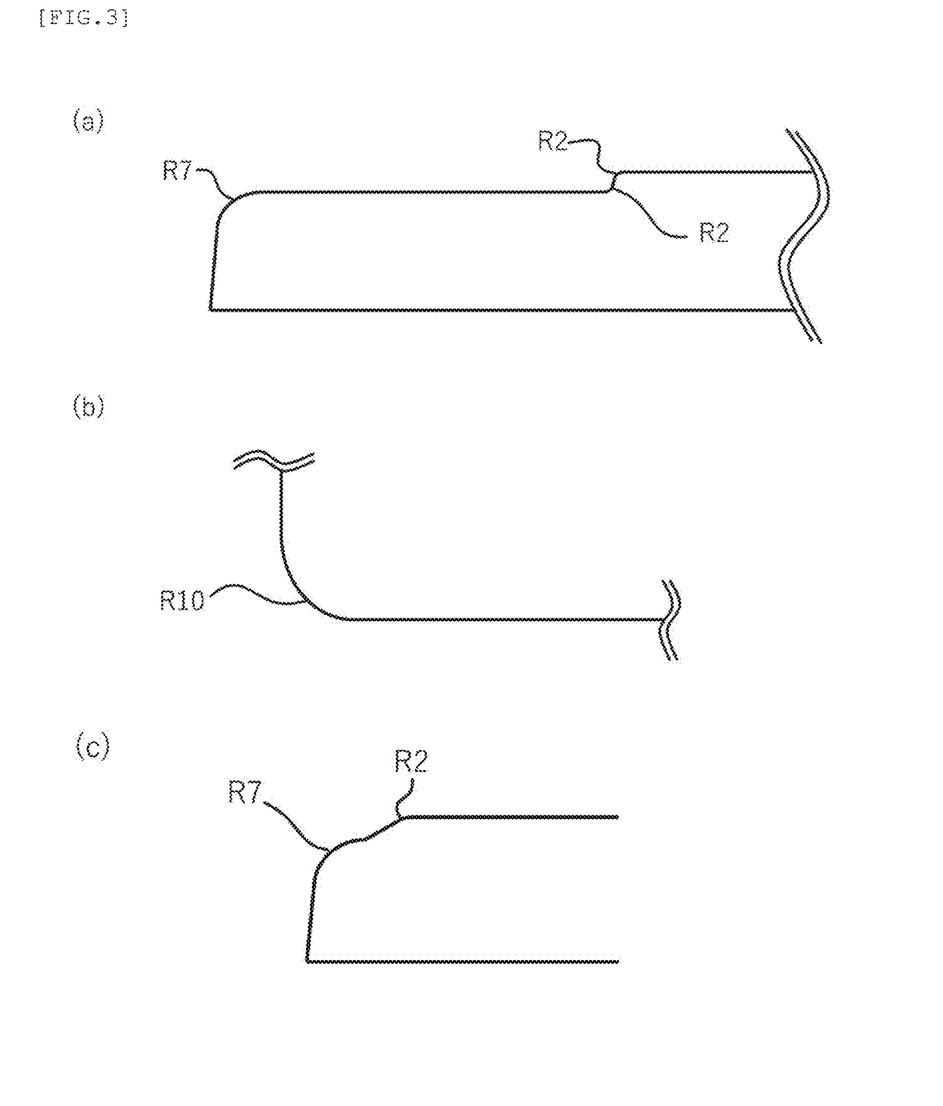
FIG. 3 depicts partial enlarged views for depicting an example of a mold for manufacturing the molded body 20 of the present embodiment.

As depicted in FIGS. 2 and 3, the mold MD has a shoulder part having a plurality of punch shoulder radii R. Specifically, FIG. 3(*a*) is an enlarged view of a shoulder part A in FIG. 2, FIG. 3(*b*) is an enlarged view of a shoulder part B in FIG. 2, and FIG. 3(*c*) is an enlarged view, as viewed from a lateral side, of a shoulder part C in FIG. 2. As depicted in FIG. 3, the shoulder part A of the mold MD is continuous at R2, the shoulder part B is continuous at R10, and the shoulder part B is continuous at R2 and R7, and, therefore, the mold MD includes a shoulder part having a plurality of shoulder radii.

In this way, since the molded body 20 of the present embodiment is molded from the abovementioned layered composite 10 by use of the abovementioned mold MD, the molded body 20 is characterized by having a shoulder part with a punch shoulder radius of 0<R≤2. In addition, this molded body is preferably manufactured by one-time press molding. Besides, the molded body 20 of the present embodiment preferably has a plurality of punch shoulder radii as depicted in FIGS. 2 and 3.

Here, the layered composite 10 of the present embodiment is characterized in that a tensile breakage elongation φ of the steel plate 120 is equal to or more than 20% and that a flexural modulus is equal to or more than 30 GPa in a flat plate state. In addition, even when the layered composite 10 of the present embodiment is molded by use of a mold having a shoulder part with a small shoulder radius R such as the mold MD depicted in FIGS. 2 and 3, either the gap between the carbon-fiber-reinforced resin 110 and the steel plate 120 or a wrinkle or breakage of the steel plate 120 is restrained, and rigidity of the layered composite can be enhanced without the thickness of the resin part being increased.

Note that the mold preferable for the present embodiment is not limited to the ones depicted in FIGS. 2 and 3, and a mold having a shoulder part with a shoulder radius of 0<R≤2 can naturally be applied to the manufacture of the molded body 20 of the present embodiment.

<<Method of Manufacturing Molded Body>>

As a method of manufacturing the molded body 20, a method of molding the abovementioned layered composite 10 by press molding with use of a mold having a shoulder part with a shoulder radius of 0<R≤2 is applicable.

Alternatively, a method of molding the abovementioned carbon-fiber-reinforced resin 110 and the steel plate 120 by press molding with use of a mold having a shoulder part with a shoulder radius of 0<R≤2 is applicable.

An example of a manufacturing method for the molded body 20 of the present embodiment will be illustrated below.

First, a mold for the molded body 20 is heated to 200° C. at 10° C./min. After the mold temperature reaches 200° C., the carbon-fiber-reinforced resin 110 and the steel plate 120 are put into the mold, and are kept at 200° C. and 0.5 MPa for 1 minute. Next, the carbon-fiber-reinforced resin 110 and the steel plate 120 are pressed at 200° C. and 10 MPa for 5 minutes, and then subjected to natural cooling. When the mold temperature becomes 70° C. or below, load is removed, whereby the molded body 20 can be obtained.

Note that the method of manufacturing the molded body 20 is not limited to the one under the above manufacturing conditions, and a known manufacturing method can be applied insofar as the characteristics of the abovementioned molded body 20 are provided.

In addition, an example of manufacturing the molded body 20 without using the layered composite 10 has been described in the abovementioned example, but the present embodiment is not limited to this. In other words, the layered composite 10 and the molded body 20 may be manufactured separately. In this case, first, the carbon-fiber-reinforced resin 110 and the steel plate 120 are put into the same mold to manufacture the layered composite 10, and thereafter the molded body 20 may be formed as secondary processing.

EXAMPLES

The present invention will specifically be described below by illustrating examples.

Example 1

[Preparation of Carbon-Fiber-Reinforced Resin]

First, carbon fiber thread (PYROFIL TR50S15L: made by Mitsubishi Chemical Corporation) was spread in a predetermined width (15 to 17 mm), and a spread tape was formed by use of a known spreading device. Next, a heat melted thermoplastic epoxy resin (XNR/H6850V: made by Nagase ChemteX Corporation) was prepared and uniformly mixed by a stirrer, to obtain a resin composition having a viscosity of 100 to 200 mPa·s. The obtained spread tape was impregnated with the resin composition, and was thereafter heated and solidified, to obtain a tape form uni-directional prepreg (fiber volume content (Vf): 40%±2%). The obtained tape form uni-directional prepreg was cut to a length of 13 mm, to obtain a chopped strand prepreg. The chopped strand prepreg was scattered and layered in a mold such that the fiber direction was at random (pseudo-isotropic properties). Then heating at 150° C. for 1 minute 30 seconds was conducted to soften the resin contained in the chopped strand prepreg and to fix the tape pieces, thereby obtaining a carbon-fiber-reinforced resin (thickness: 1.9 mm).

[Preparation of Steel Plate]

A cold rolled steel plate having a thickness of 0.1 mm was subjected to an alkali electrolytic degreasing treatment and a sulfuric acid pickling treatment by ordinary methods. Tensile modulus, tensile breakage elongation (elongation) (%), specific gravity, frictional coefficient, and the parameter S obtained by the abovementioned calculation formula are as set forth in Table 1.

[Manufacture of Layered Composite]

After a mold for the flat plate form layered composite was heated to 180° C., the abovementioned carbon-fiber-reinforced resin and the steel plate were put into the mold, preliminary heating at 180° C. and 0.5 MPa was conducted for 3 minutes, and pressing at 180° C. and 4 MPa was conducted for 12 minutes. After cooling down to 70° C., load was removed, and the carbon-fiber-reinforced resin and the steel plate were taken out, to obtain the layered composite.

[Manufacture of Molded Body]

As a mold for the molded body, a mold MD depicted in FIG. 2 was prepared. This mold MD has a plurality of corner parts, which have R values of R2, R7, and R10.

The layered composite obtained above was placed in the mold MD heated to 200° C. In this case, the outer surface of the projected shape of the molded body was made to be the steel plate. After placing the layered composite in the mold, preliminary heating was conducted at 200° C. and 0.5 MPa, pressing at 200° C. and 10 MPa was then conducted for 5 minutes, and, after cooling down to 70° C., demolding was performed to obtain the molded body.

[Evaluation]

(A) Flexural Property (Flexural Modulus) Evaluation

In regard of the flat plate form layered composite, the flexural modulus was evaluated as follows.

The average flexural modulus of the layered composite was measured in compliance with ASTM D-790 by use of a precision universal testing machine (autograph AG-100kNXplus) made by SHIMADZU CORPORATION. Specifically, from the obtained flat plate form layered composite (flat plate), a rectangular specimen of a length of 80±1.0 nm and a width of 25±0.2 mm in any length direction was cut out, and was used as a measurement specimen. Similarly, a total of 10 measurement specimens were prepared. For each of the measurement specimens, a span of 64 mml and a test speed of 3.4 mm/min were applied to measure the flexural modulus, with a probe side on five steel surfaces and five carbon surfaces. The average value of the flexural modulus for the 10 measurement specimens was set forth as the average flexural modulus in Table 2. In addition, the specific flexural modulus was also set forth in Table 2.

Note that the case where the average flexural modulus is equal to or more than 30 could be determined as being favorable.

(B) Evaluation of Moldability

The evaluation of moldability of the molded body manufactured by the layered composite obtained above was evaluated as follows. Specifically, in regard of the throttle surface of a corner part and a central part of the molded body obtained, (a) whether or not breakage of the steel plate is present, (b) whether or not a wrinkle is generated on the surface of the steel plate, and (3) whether or not a gap is generated at the layered surface of the carbon-fiber-reinforced resin and the steel plate, were visually observed. As a result of observation, evaluation was made with Excellent, Good, and Poor as set forth below, and set forth in Table 2.

Excellent: A corner part and a central part are free of a wrinkle or breakage, and no gap is generated at the layered surface.

Good: A wrinkle, breakage, or a gap is generated at a corner part.

Poor: A wrinkle, breakage, or a gap is generated at a corner part and a central part.

Example 2

The thickness of each of the carbon-fiber-reinforced resin and the steel plate was set as set forth in Table 1. The annealing conditions of the steel plate were changed to set the elongation as set forth in Table 1. The frictional coefficient is also set forth in Table 1. Other factors were similar to those in Example 1. The results are set forth in Table 2.

Example 3

The thickness of each of the carbon-fiber-reinforced resin and the steel plate was set as set forth in Table 1. The annealing conditions of the steel plate were changed to set the elongation as set forth in Table 1. The frictional coefficient is also set forth in Table 1. Other factors were similar to those in Example 1. The results are set forth in Table 2.

Example 4

The annealing conditions of the steel plate were changed to set the elongation as set forth in Table 1. The frictional coefficient is also set forth in Table 1. As a steel plate, a surface treated steel plate subjected to compound Zn plating including Zn—Co—Mo and a phosphate system chemical conversion treatment were used. Other factors were similar to those in Example 2. The results are set forth in Table 2.

Example 5

The annealing conditions of the steel plate were changed to set the elongation as set forth in Table 1. The frictional coefficient is also set forth in Table 1. As a steel plate, a surface treated steel plate subjected to compound Zn plating including Zn—Co—Mo, a vanadium system chemical conversion treatment, and a urethane resin coating were used. Other factors were similar to those in Example 2. The results are set forth in Table 2.

Example 6

The annealing conditions of the steel plate were changed to set the elongation as set forth in Table 1. The frictional coefficient is also set forth in Table 1. As a steel plate, surface treated steel plates subjected to compound Zn plating including Zn—Co—Mo, a vanadium system chemical conversion treatment, and a olefin-modified acrylic resin coating were used. Other factors were similar to those in Example 2. The results are set forth in Table 2.

Example 7

In the manufacture of the layered composite, first, a thermal adhesion film was thermally laminated to produce a thermal adhesion film steel plate. Next, the thermal adhesion film steel plate and the carbon-fiber-reinforced resin were thermocompression bonded to each other to obtain a layered composite. Thereafter, the thus obtained layered composite was pressed at 180° C. and 4 MPa for 12 minutes. After cooling down to 70° C., load is removed, and the layered composite was taken out, to obtain the layered composite. Other factors are similar to those in Example 2. The results are set forth in Table Example 8

The annealing conditions of the steel plate were changed to set the elongation as set forth in Table 1. The frictional coefficient is also set forth in Table 1. Other factors were similar to those in Example 2. The results are set forth in Table 2.

Comparative Example 1

The example was carried out in a manner similar to that of Example 1 except that the thickness of the carbon-fiber-reinforced resin was 2.0 mm and the steel plate was not used. The results are illustrated in Table 2.

Comparative Example 2

The carbon-fiber-reinforced resin was a carbon fiber texture impregnated with a thermoplastic polypropylene resin. The thickness and the fiber volume content (Vf) were as set forth in Table 1. Other factors were similar to those in Example 2. The results are set forth in Table 2.

Comparative Example 3

The annealing conditions of the steel plate were changed to set the elongation as set forth in Table 1. The frictional coefficient is also set forth in Table 1. Other factors were similar to those in Example 2. The results are set forth in Table 2.

Comparative Example 4

The annealing conditions of the steel plate were changed to set the elongation as set forth in Table 1. The frictional coefficient is also set forth in Table 1. Other factors are similar to those in Example 2. The results are set forth in Table 2.

Comparative Example 5

As a steel plate, an aluminum plate having a thickness of 0.1 mm was used. Elongation and the like are as set forth in Table 1. Other factors are similar to those in Example 1. The results are set forth in Table 2.

Comparative Example 6

The annealing conditions of the steel plate were changed to set the elongation as set forth in Table 1. The frictional coefficient is also set forth in Table 1. Other factors are similar to those in Example 2. The results are set forth in Table 2.

TABLE 1

| | Carbon-fiber-reinforced resin | | | | | Steel plate | | |
| --- | --- | --- | --- | --- | --- | --- | --- | --- |
| | Resin | Fiber form | Thickness (mm) | Flexural modulus Gc | Vf | Kind | Thickness (mm) | Surface treatment (plating) |
| Example 1 | EP | Random | 1.9 | 26 | 40 | Fe | 0.1 | — |
| Example 2 | EP | Random | 1.8 | 26 | 40 | Fe | 0.2 | — |
| Example 3 | EP | Random | 1.6 | 26 | 40 | Fe | 0.4 | — |
| Example 4 | EP | Random | 1.8 | 26 | 40 | Fe | 0.2 | compound Zn |
| Example 5 | EP | Random | 1.8 | 26 | 40 | Fe | 0.2 | compound Zn |
| Example 6 | EP | Random | 1.8 | 26 | 40 | Fe | 0.2 | compound Zn |
| Example 7 | EP | Random | 1.8 | 26 | 40 | Fe | 0.2 | — |
| Example 8 | EP | Random | 1.8 | 26 | 40 | Fe | 0.2 | — |
| Comparative example 1 | EP | Random | 2.0 | 26 | 40 | — | — | — |
| Comparative example 2 | PP | Texture | 1.0 | 47 | 50 | Fe | 0.2 | — |
| Comparative example 3 | EP | Random | 1.8 | 26 | 40 | Fe | 0.2 | — |
| Comparative example 4 | EP | Random | 1.8 | 26 | 40 | Fe | 0.2 | — |
| Comparative example 5 | EP | Random | 1.9 | 26 | 40 | Al | 0.1 | — |
| Comparative example 6 | EP | Random | 1.8 | 26 | 40 | Fe | 0.2 | — |

| | Steel plate | | | | | | |
| --- | --- | --- | --- | --- | --- | --- | --- |
| | Surface treatment (chemical conversion treatment) | Surface treatment (resin coating) | Tensile modulus | Elongation (%) | Specific gravity | Frictional coefficient | S |
| Example 1 | — | — | 200 | 32 | 7.8 | 0.425 | 7.5 |
| Example 2 | — | — | 200 | 37 | 7.8 | 0.388 | 19.1 |
| Example 3 | — | — | 200 | 42 | 7.8 | 0.416 | 40.4 |
| Example 4 | phosphate | — | 200 | 36 | 7.8 | 0.237 | 30.4 |
| Example 5 | vanadium system | urethane | 200 | 34 | 7.8 | 0.189 | 36.0 |
| Example 6 | vanadium system | olefin-modified acryl | 200 | 31 | 7.8 | 0.267 | 23.2 |
| Example 7 | — | — | 200 | 37 | 7.8 | 0.368 | 19.1 |
| Example 8 | — | — | 200 | 25 | 7.8 | 0.316 | 15.8 |
| Comparative example 1 | — | — | — | — | — | — | — |
| Comparative example 2 | — | — | 200 | 37 | 7.8 | 0.388 | 19.1 |
| Comparative example 3 | — | — | 200 | 3 | 7.8 | 0.357 | 1.7 |
| Comparative example 4 | — | — | 200 | 19 | 7.8 | 0.636 | 6.0 |
| Comparative example 5 | — | — | 68 | 35 | 2.7 | 1.115 | 3.1 |
| Comparative example 6 | — | — | 200 | 15 | 7.8 | 0.528 | 5.7 |

EP: thermoplastic epoxy resin
PP: thermoplastic polypropylene resin

TABLE 2

| | Layering condition | | | Evaluation | | | |
| --- | --- | --- | --- | --- | --- | --- | --- |
| | | | | Layered composite (flat plate) | | Layered composite (molded body) | |
| | Layer configuration | Layering method | Layer temperature/ time (° C./min) | Specific gravity | Flexural modulus | Specific flexural modulus | Metal break | Over-all evaluation |
| Example 1 | Two-layer | Thermocompression bonding | 200° C/ 10 min | 1.7 | 35 | 20 | Good | Good |

TABLE 2-continued

| | | Layering condition | | | Evaluation | | | |
| | | | | | Layered composite (flat plate) | | Layered composite (molded body) | |
| | Layer configuration | Layering method | Layer temperature/ time (° C./min) | Specific gravity | Flexural modulus | Specific flexural modulus | Metal break | Over-all evaluation |
|---|---|---|---|---|---|---|---|---|
| Example 2 | Two-layer | Thermocompression bonding | 200° C./10 min | 2.0 | 47 | 23 | Good | Good |
| Example 3 | Two-layer | Thermocompression bonding | 200° C./10 min | 2.7 | 54 | 20 | Excellent | Excellent |
| Example 4 | Two-layer | Thermocompression bonding | 200° C./10 min | 2.0 | 46 | 22 | Excellent | Excellent |
| Example 5 | Two-layer | Thermocompression bonding | 200° C./10 min | 2.0 | 49 | 24 | Excellent | Excellent |
| Example 6 | Two-layer | Thermocompression bonding | 200° C./10 min | 2.0 | 46 | 22 | Excellent | Excellent |
| Example 7 | Two-layer | Thermal film | 200° C./10 min | 2.0 | 43 | 22 | Good | Good |
| Example 8 | Two-layer | Thermocompression bonding | 200° C./10 min | 2.0 | 48 | 24 | Good | Good |
| Comparative example 1 | — | — | — | 1.4 | 26 | 19 | — | Poor |
| Comparative example 2 | Two-layer | Thermocompression bonding | 200° C./10 min | 2.0 | 54 | 27 | Poor | Poor |
| Comparative example 3 | Two-layer | Thermocompression bonding | 200° C./10 min | 2.0 | 53 | 26 | Poor | Poor |
| Comparative example 4 | Two-layer | Thermocompression bonding | 200° C./10 min | 2.0 | 51 | 25 | Poor | Poor |
| Comparative example 5 | Two-layer | Thermocompression bonding | 200° C./10 min | 1.5 | 27 | 18 | Poor | Poor |
| Comparative example 6 | Two-layer | Thermocompression bonding | 200° C./10 min | 2.0 | 51 | 25 | Poor | Poor |

Each Example was confirmed to have such properties as preferable flexural modulus and moldability. On the other hand, none of Comparative Examples were confirmed to have such properties.

Note that the embodiment and each Example can variously be modified within such a range as not to depart from the gist of the present invention. In addition, the layered composite and the molded body using the layered composite in the Embodiment and Examples have mainly been described to be used as automobile member or housing of electronic apparatus, but these uses are not limitative and other uses such as heat radiators and electromagnetic shielding materials are applicable.

INDUSTRIAL APPLICABILITY

As has been described above, the layered composite and the molded body using the layered composite of the present invention are applicable to wide industrial field such as automobiles and electronic apparatuses.

REFERENCE SIGN LIST

10: Layered composite
110: Carbon-fiber-reinforced resin
120: Steel plate
20: Molded body
MD: Mold

The invention claimed is:

1. A layered composite comprising:
a carbon-fiber-reinforced resin in which a chopped strand prepreg including carbon fiber tow impregnated with resin is oriented in such a manner as to exhibit pseudo-isotropic properties; and
a steel plate that is layered on at least one surface of the carbon-fiber-reinforced resin and has a tensile breakage elongation φ of equal to or more than 20%,
wherein a flexural modulus of the layered composite in a flat plate state obtained in compliance with American Society for Testing and Materials D-790 is equal to or more than 30 GPa, and
wherein the steel plate has a value S of the following formula of equal to or more than 7.5, wherein S [mm]=(thickness t [mm] of steel plate×tensile breakage elongation φ)/(frictional coefficient μ of steel plate), and the tensile breakage elongation φ is expressed in percent.

2. The layered composite according to claim 1, wherein a ratio of a thickness of the steel plate to a total thickness of the layered composite is 0.01 to 0.2.

3. The layered composite according to claim 1, wherein the steel plate is a surface treated steel plate, and the surface treatment is plating including Zn or Ni.

4. The layered composite according to claim 1, wherein a specific flexural modulus of the layered composite is equal to or more than 20 GPa.

* * * * *